United States Patent
Marrucci (10) Patent No.: US 9,410,633 B2
(45) Date of Patent: Aug. 9, 2016

(54) REMOTELY-ACTUATED DUAL-PRESSURE RELIEF VALVE

(71) Applicant: Adelmo Marrucci, Piracicaba (BR)

(72) Inventor: Adelmo Marrucci, Piracicaba (BR)

(73) Assignee: Industrias Marrucci Ltda., Piracicaba (BR)

( * ) Notice: Subject to any disclaimer, the term of this patent is extended or adjusted under 35 U.S.C. 154(b) by 166 days.

(21) Appl. No.: 14/467,078

(22) Filed: Aug. 25, 2014

(65) Prior Publication Data

US 2016/0053906 A1   Feb. 25, 2016

(51) Int. Cl.
*F16K 17/06* (2006.01)
*F16K 17/04* (2006.01)
*G05D 16/10* (2006.01)

(52) U.S. Cl.
CPC ............. *F16K 17/065* (2013.01); *F16K 17/044* (2013.01); *F16K 17/06* (2013.01); *G05D 16/10* (2013.01); *Y10T 137/7832* (2015.04); *Y10T 137/7905* (2015.04)

(58) Field of Classification Search
CPC ..... F16K 17/04; F16K 17/044; F16K 17/048; F16K 17/06; F16K 17/065; G05D 16/10; G05D 16/106; Y10T 137/7832; Y10T 137/7905
USPC .................................. 137/506, 529
See application file for complete search history.

(56) References Cited

U.S. PATENT DOCUMENTS

| | | | | |
|---|---|---|---|---|
| 2,600,875 A * | 6/1952 | Hrdlicka, Jr. | ............ | F16K 17/04 137/494 |
| 2,686,534 A * | 8/1954 | Montelius | ............ | F16K 17/0433 137/514 |
| 2,770,255 A * | 11/1956 | Goddard | ................. | F16K 17/06 137/529 |
| 6,581,639 B2 * | 6/2003 | Fiala | ..................... | F16B 11/028 137/596.2 |
| 6,701,823 B2 * | 3/2004 | Weber | ..................... | F15B 11/04 91/436 |
| 6,837,266 B2 * | 1/2005 | Fredrickson | .......... | F16K 17/065 137/529 |

* cited by examiner

*Primary Examiner* — Kevin Murphy
*Assistant Examiner* — Richard K Durden
(74) *Attorney, Agent, or Firm* — Porter, Wright, Morris & Arthur, LLP (57) ABSTRACT

A relief valve assembly includes an actuating assembly, a relief valve, and a check valve. The actuating assembly includes a housing forming a cylinder, and a pilot piston within the cylinder. The relief valve includes a housing forming opposed first and second blind bores, a relief valve piston within the first bore and carrying a relief valve member, and a first spring acting between the pilot piston and the relief valve piston to bias the relief valve member toward a valve seat to close the valve seat. A pilot pressure is selectively applied to move the pilot piston toward the first spring to selectively increase the relief pressure of the relief valve from a first relief pressure to a second relief pressure. The check valve includes a check valve member within the second blind bore, a second spring biasing the check valve member away the second blind bore.

19 Claims, 5 Drawing Sheets

REMOTELY-ACTUATED DUAL-PRESSURE RELIEF VALVE

CROSS-REFERENCE TO RELATED APPLICATIONS

Not Applicable

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to pressure relief valves and, more particularly, to pressure relief valves that are remotely actuated between a plurality of predetermined relief pressures.

BACKGROUND OF THE INVENTION

It is common for companies to have more than one kind of equipment utilizing hydraulic pumps. For example, trucking companies often have both trucks with dump trailers and trucks with live-floor trailers. A dumping system for a trailer quickly unloads material from the trailer floor by tipping or tilting the trailer floor with a hydraulic drive system so that the material slides off either an end or a side of the floor depending on the direction that it is tipped. A live or moving floor for a trailer moves material along the trailer floor to facilitate loading and unloading. Typically, the floor is divided into three sets of narrow floor slats with every third slat connected together to move forward and backward in unison by operation of hydraulic drive system. When all three sets of slats move in unison in one direction, the material resting thereon moves along with them. Slat retraction (during which the material does not move) is accomplished by moving only one of the sets of slats at a time (friction of the material resting on the two stationary sets of slats keeps the material from moving while the single moving set of slats slides past).

Hydraulic drive systems for dump trailers typically operate at about 2500 PSI pressure and hydraulic drive systems for live floor trailers typically operate at about 3200 PSI pressure. Therefore, trucking companies utilizing both dump trailers and live floor trailers must stock, install, and maintain multiple types of hydraulic pump systems and components such as, for example, pressure relief valves. Pressure relief valves are utilized to protect the hydraulic system from excess pressure by automatically relieving system pressure when the system pressure reaches a predetermined relief pressure which indicates there is some kind of failure within the system before there is a catastrophic failure. Thus, the trucking companies must use different pressure relief valves to account for the differing operating pressures of the dump trailers and the live-floor trailers.

Accordingly, there is a need for an improved relief valve that can be selectively actuated to automatically operate at one of at least two predetermined relief pressures so that it can be utilized in hydraulic pump systems having differing operating pressures such as, for example, hydraulic pump systems of dump trailers and live floor trailers.

SUMMARY OF THE INVENTION

Disclosed are relief valve assemblies which address one or more issues of the related art. Disclosed is a dual-pressure relief valve assembly comprising, in combination, a pilot piston housing forming a pilot piston cylinder, a pilot piston movable within the pilot piston cylinder of the pilot piston housing, a relief valve housing secured to the pilot piston housing and forming a bore and a relief valve seat along the bore, a relief valve piston movable within the bore of the relief valve housing and carrying a relief valve member configured to close the relief seat when engaging the relief valve seat, a resilient spring acting between the pilot piston and the relief valve piston. The pilot piston cylinder is provided with a pilot port to selectively engage the pilot piston with a predetermined pilot pressure to selectively move the pilot piston toward the resilient spring and the relief valve piston. The resilient spring biases the relief valve member into engagement with the relief valve seat with a first predetermined relief pressure when the predetermined pilot pressure is not applied to the pilot piston and with a second predetermined relief pressure when the predetermined pilot pressure is applied to the pilot piston. The second predetermined relief pressure is larger than the first predetermined relief pressure.

Also disclosed is a dual-pressure relief valve assembly comprising, in combination, an actuating assembly, a relief valve, and a check valve. The disclosed actuating assembly comprises a pilot piston housing forming a pilot piston cylinder, and a pilot piston movable within the pilot piston cylinder of the pilot piston housing. The disclosed relief valve comprises a relief valve housing secured to the pilot piston housing and forming a first bore, a relief valve seat along the first bore, and a second bore, a relief valve piston movable within the first bore of the relief valve housing and carrying a relief valve member configured to close the relief seat when engaging the relief valve seat, and a first resilient spring acting between the pilot piston and the relief valve piston to bias the relief valve member toward the relief valve seat. The pilot piston cylinder is provided with a pilot port to selectively engage the pilot piston with a predetermined pilot pressure to selectively move the pilot piston toward the first resilient spring and the relief valve piston. The first resilient spring biases the relief valve member into engagement with the relief valve seat with a first predetermined relief pressure when the predetermined pilot pressure is not applied to the pilot piston and with a second predetermined relief pressure when the predetermined pilot pressure is applied to the pilot piston. The second predetermined relief pressure is larger than the first predetermined relief pressure. The disclosed check valve comprises a check valve member movable within the second bore, and at least one second resilient spring acting between the relief valve housing and the check valve member to bias the check valve member away from the relief valve housing.

Also disclosed is a dual-pressure relief valve assembly comprising, in combination, an actuating assembly, a relief valve and a check valve. The disclosed actuating assembly comprises a pilot piston housing forming a pilot piston cylinder, and a pilot piston movable within the pilot piston cylinder of the pilot piston housing. The disclosed relief valve comprises a relief valve housing secured to the pilot piston housing and forming a first blind bore, a relief valve seat along the first bore near a blind end of the first blind bore, and a second blind bore, a relief valve piston movable within the first bore of the relief valve housing and carrying a relief valve member configured to close the relief seat when engaging the relief valve seat, and a first resilient spring acting between the pilot piston and the relief valve piston to bias the relief valve member toward the relief valve seat. The second blind bore is coaxial with the first blind bore and facing opposite the first blind bore. The pilot piston cylinder is provided with a pilot port to selectively engage the pilot piston with a predetermined pilot pressure to selectively move the pilot piston toward the first resilient spring and the relief valve piston. The first resilient spring biases the relief valve member into engagement with the relief valve seat with a first predetermined relief pressure when the predetermined pilot pressure is not applied to the pilot piston and with a second predetermined relief pressure when the predetermined pilot pressure is applied to the pilot piston. The second predetermined relief pressure is larger than the first predetermined relief pressure. The disclosed check valve comprises a check valve member movable within the second blind bore, at least one second resilient spring acting between a blind end of the second blind bore and the check valve member to bias the check valve member away from the blind end of the second blind bore, and a check valve retainer secured within the second blind bore and forming an outer limit for movement of the check valve member within the second blind bore.

From the foregoing disclosure and the following more detailed description of various preferred embodiments it will be apparent to those skilled in the art that the present invention provides a significant advance in the technology and art of pressure relief valves. Particularly significant in this regard is the potential the invention affords for providing versatile and easy to use pressure relief valves that can be remotely actuated to automatically operate at one of at least two predetermined relief pressures by remotely commanding a pilot pressure. Additional features and advantages of various preferred embodiments will be better understood in view of the detailed description provided below.

BRIEF DESCRIPTION OF THE DRAWINGS

These and further features of the present invention will be apparent with reference to the following description and drawings.

It should be understood that the appended drawings are not necessarily to scale, presenting a somewhat simplified representation of various preferred features illustrative of the basic principles of the invention. The specific design features of the pressure relief valves as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the pressure relief valves illustrated in the drawings. In general, up or upward generally refers to an upward direction within the plane of the paper in FIGS. 2 and 3 and down or downward generally refers to a downward direction within the plane of the paper in FIGS. 2 and 3.

DETAILED DESCRIPTION OF CERTAIN PREFERRED EMBODIMENTS

It will be apparent to those skilled in the art, that is, to those who have knowledge or experience in this area of technology, that many uses and design variations are possible for the pressure relief valves disclosed herein. The following detailed discussion of various alternative and preferred embodiments will illustrate the general principles of the invention. Other embodiments suitable for other applications will be apparent to those skilled in the art given the benefit of this disclosure.

Figure 1:
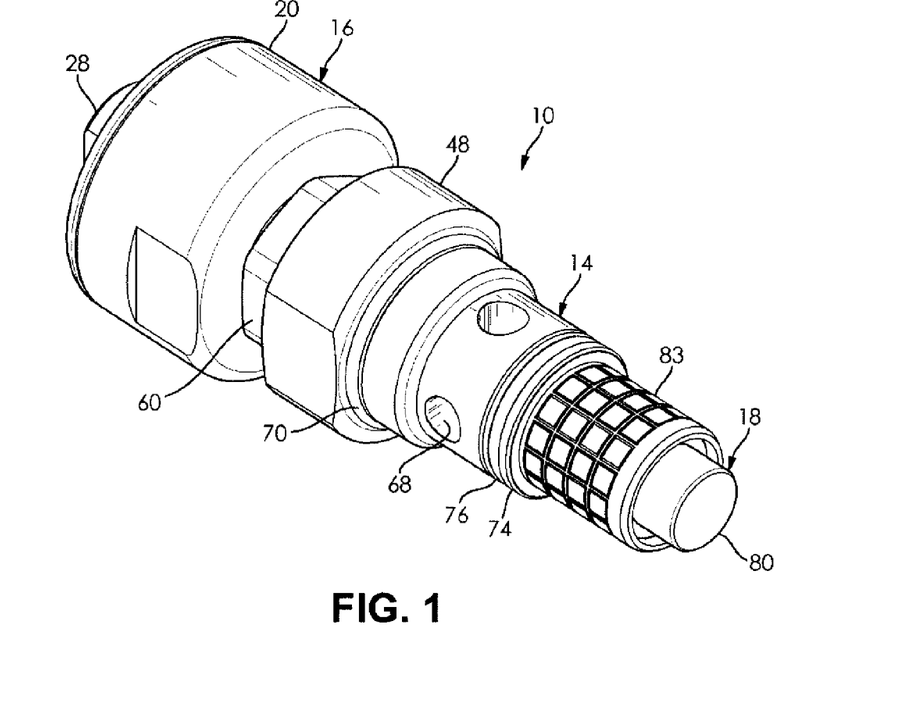
FIG. 1 is a perspective view of a relief valve assembly or cartridge according to the present invention.
Figure 2:
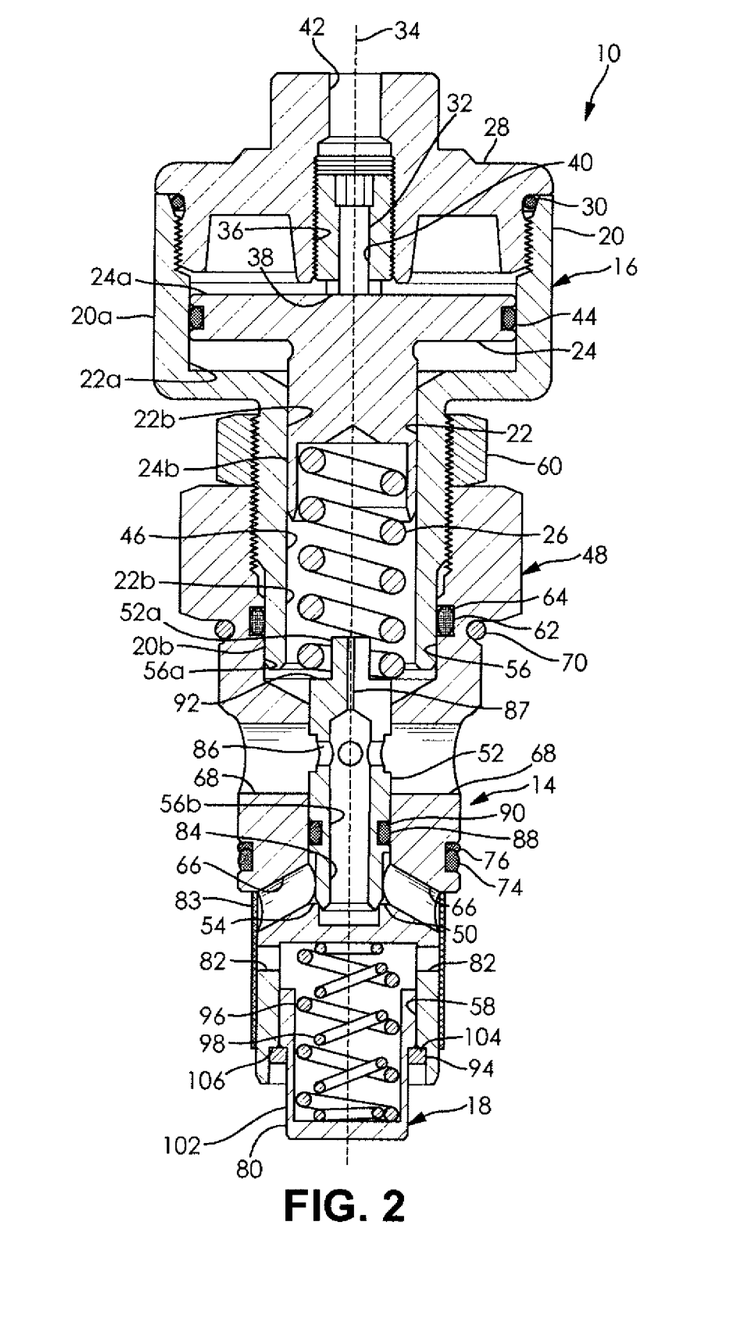
FIG. 2 is a cross-sectional view of the relief valve assembly of FIG. 1.

Referring now to the drawings, FIGS. 1 and 2 show a remotely-actuated, dual-pressure relief valve assembly or cartridge 10 for a hydraulic pump system 12 (FIGS. 3 to 7) according to the present invention. The illustrated dual-pressure relief valve assembly 10 includes a relief valve 14, an actuating or pilot cylinder assembly 16 adjustably secured to and cooperating with the relief valve 14, and a check valve 18.

The illustrated actuating or pilot cylinder assembly 16 includes a pilot piston housing 20 forming a longitudinally-extending pilot cylinder or chamber 22, a pilot piston 24 closely received within the pilot cylinder 22 for longitudinal sliding movement within the pilot cylinder 22, and a resilient spring 26 biasing the pilot piston 24 in one direction within the pilot cylinder 22. The illustrated pilot piston housing 20 has a first or upper enlarged diameter portion 20a forming an upper end of the pilot piston housing 20 and a second or lower reduced diameter portion 20b forming a lower end of the pilot piston housing 20, wherein the upper portion 20a has a diameter larger than a diameter of the lower portion 20b. Formed in this manner, the pilot cylinder 22 has a first or upper enlarged diameter portion 22a forming an upper end of the pilot cylinder 22 and a second or lower reduced diameter portion 22b forming a lower end of the pilot cylinder 22, wherein the upper portion 22a has a diameter larger than a diameter of the lower portion 22b. The upper and lower ends of the illustrated pilot piston housing 20 are generally open.

The open upper end of the illustrated pilot piston housing is selectively closed by an adjuster housing 28 removably secured to the upper end of the pilot piston housing 20. The illustrated adjuster housing 28 is threadably secured within the open upper end of the pilot piston housing 20 in a plug-like manner with external threads of the adjuster housing 28 cooperating with internal threads of the pilot piston housing 20 but any other suitable method of connection can alternatively be utilized. The illustrated adjuster housing 28 is provided with a seal 30 in the form of an O-ring to form a suitable fluid-tight connection between the adjuster housing 28 and the pilot piston housing 20 to seal the pilot cylinder 22 but any other suitable type of fluid-tight seal 30 can alternatively be utilized.

A longitudinally-extending adjusting member 32 in the form of an adjusting screw is threadably secured to the adjuster housing 28 at a central longitudinal axis 34 of the pilot cylinder 22 (as well as the pilot piston housing 20 and the dual-pressure relief valve assembly 10). The illustrated adjusting member 32 has external threads that cooperate with internal threads of an internally threaded bore 36 located at a lower or inner end of the adjuster housing 28 so that the adjusting member 32 is removably secured to the adjuster housing 28 and can be longitudinally moved along the central longitudinal axis 34 relative to the adjuster housing 28 to be selectively positioned relative to the adjuster housing 28. A first or upper end of the illustrated adjusting member 32 is configured to cooperate with a tool for adjusting the position of the adjusting member 32 relative to the adjuster housing 28. A second or lower end of the adjusting member 32 extends into the pilot cylinder 22 and forms a downward or inner facing abutment or stop 38 that provides an upper limit for travel of the pilot piston 24 in the pilot cylinder 22 as is described in more detail hereinbelow. The illustrated adjusting member 32 is provided with a central passage 40 extending entirely though the adjusting member 32 that cooperates with a centrally located pilot port 42 formed in the adjuster housing 28 so that pressurized fluid, such as compressed air, provided to the upper or outer end of the pilot port 42 is communicated through the adjusting member 32 to the pilot cylinder 22 above the pilot piston 24 as described in more detail hereinbelow.

The open lower end of the illustrated pilot piston housing 20 is configured to be secured to and cooperate with the relief valve 14 as will be described in more detail hereinbelow. The illustrated reduced diameter portion 20b of the pilot piston housing 20 is provided with external threads for attachment to the relief valve 14 but any other suitable method of attachment can alternatively be utilized.

The illustrated pilot piston 24 has a first or upper enlarged diameter portion 24a forming an upper end of the pilot piston 24 and a second or lower reduced diameter portion 24b forming a lower end of the pilot piston 24, wherein the reduced diameter portion 24b has a diameter smaller than the enlarged diameter portion 24a. The upper portion 24a of the pilot piston 24 is sized to be closely received within the upper portion 22a of the pilot cylinder 22 for longitudinal sliding movement therein and the lower portion 24b of the pilot piston 24 is sized to be closely received within the lower portion 22b of the piston cylinder 22 for longitudinal sliding movement therein. An outer circumferential recess is provided in the illustrated upper portion 24a of the pilot piston 24 which receives a seal 44 in the form of an O-ring that cooperates with the circumferential wall of the upper portion 22a of the pilot cylinder 22 to form a suitable fluid-tight seal therebetween. It is noted that any other suitable type of fluid-tight seal 44 can alternatively be utilized. The lower end of the illustrated pilot piston 24 has a central blind bore 46 therein sized to receive the spring 26 that is configured to cooperate with the relief valve 14 as described in more detail hereinbelow. The illustrated spring 26 is a helical-coiled compression spring but any other suitable type of spring 26 can alternatively be utilized The illustrated relief valve 14 includes a relief valve housing or cartridge 48 forming a relief valve seat 50 therein, and a relief valve piston 52 longitudinally movable within the relief valve housing 48 and carrying a relief valve member 54 configured for closing and opening the relief valve seat 50. The illustrated relief valve housing 48 has a longitudinally-extending first or upper blind bore 56 downwardly extending along the central longitudinal axis 34 of the relief valve housing 48 and the dual-pressure relief valve assembly 10 from an open upper end of the relief valve housing 48 to a lower closed end. The illustrated relief valve housing 48 also has longitudinally-extending second or lower blind bore 58 upwardly extending along the central longitudinal axis 34 of the relief valve housing 48 and the dual-pressure relief valve assembly 10 from an open lower end of the relief valve housing 48 to an upper closed end. The illustrated upper blind bore 56 includes a first or upper portion 56a configured to receive and cooperate with the lower end of the pilot piston housing 20 and a second or lower portion 56b configured to receive and cooperate with the relief valve piston 52. The illustrated upper portion 56a terminates into the lower portion 56b and has a diameter that is larger than a diameter of the lower portion 56b. The illustrated lower blind bore 58 is configured to receive and cooperate with the check valve 18 as described in more detail hereinbelow.

The upper end of the upper portion 56a of the upper blind bore 56 is internally threaded to cooperate with the external threads of the pilot piston housing 20. The lower portion 20b of the illustrated pilot piston housing 20 is threadably secured within the relief valve housing 48 in the longitudinal direction so the longitudinal position of the pilot piston housing 20 relative to the relief valve housing 48 is adjustable. A lock or jam nut 60 is provided that cooperates with the external threads of the pilot piston housing 20 above the relief valve housing 48 and engageable with the upper end of the relief valve housing 48 to removably lock the longitudinal position of the pilot piston housing 20 relative to the relief valve housing 48. It is noted that any other suitable type of longitudinally-adjustable connection can alternatively be utilized. The illustrated upper portion 56a of the upper blind bore 56 is also provided with a circumferential recess below the internal threads which receives a seal 62 and a backup seal 64 in the form of O-rings that cooperate with circumferential outer wall of the lower portion 20b of the pilot piston housing 20 to form a suitable fluid-tight seal therebetween. It is noted that any other suitable type of fluid-tight seals 62, 64 can alternatively be utilized.

The illustrated lower portion 56b of the upper blind bore 56 is sized to closely receive the relief valve piston 52 therein. The lower end of the illustrated lower portion 56b is provided with the relief valve seat 50 that is configured to cooperate with the relieve valve member 54 carried by the relief valve piston 52. The illustrated relief valve seat 50 is upward facing and annular shaped and is position near the closed lower end of the lower portion 56b of the upper blind bore 56. Relief valve ports 66 are provided in the side wall of the relief valve housing 48 and laterally extend from the outer surface of the relief valve housing 48 to the lower portion 56b of the upper blind bore 56 upwardly adjacent the relief valve seat 50. The illustrated relief valve ports 66 are upwardly inclined or angled in an inwardly direction so that flow into the relief valve ports 66 is directed in a generally upward direction in the lower portion 56b of the upper blind bore 56 in a direction away from the relief valve seat 50. The illustrated relief valve housing 48 is provided with four relief valve ports 66 that are equally spaced about the outer circumference of the relief valve housing 48 but it is noted that any suitable quantity of one or more of the relief valve ports 66 can be utilized. Return line ports 68 are provided in the side wall of the relief valve housing 48 and laterally extend from the outer surface of the relief valve housing 48 to the lower portion 56b of the upper blind bore 56 at a location spaced above the relief valve ports 66 and the relief valve seat 50. The illustrated return line ports 68 are substantially perpendicular to the central longitudinal axis 34 of the upper blind bore 56 and the relief valve housing 48 so that flow out of the return line ports 68 is generally horizontal. The illustrated relief valve housing 48 is provided with four of the return line ports 68 that are equally spaced about the outer circumference of the relief valve housing 48 but it is noted that any suitable quantity of one or more of the return line ports 68 can be utilized.

The illustrated relief valve housing 48 is also provided with a seal 70 in the form of an O-ring on its outer circumference above the return line ports 68 to form a suitable fluid-tight connection between the relief valve housing 48 and a control valve housing 72 or other member (best seen in FIG. 3) in which the dual-pressure relief valve assembly 10 is installed. It is noted that any other suitable type of fluid-tight seal 70 can alternatively be utilized. The illustrated relief valve housing 48 is also provided with a seal 74 and a backup seal 76 in the form of O-rings on its outer circumference below the return line ports 68 and above the relief valve ports 66 to form a suitable fluid-tight connection between the relief valve housing 48 and the control valve housing 72 or other member in which the dual-pressure relief valve assembly 10 is installed. It is noted that any other suitable type of fluid-tight seals 74, 76 can alternatively be utilized. The seals 70, 74, 76 cooperate to suitably seal the return line ports 68 for communication with a return line chamber 78 or other suitable line in the control valve housing 72 or other member to which the dual-pressure relief valve assembly 10 is installed.

The illustrated lower blind bore 58 is downward facing and is sized and shaped to closely receive a check valve member 80 of the check valve 18 therein. Check valve ports 82 are provided in the side wall of the relief valve housing 48 and laterally extend from the outer surface of the relief valve housing 48 to the lower blind bore 58 at a location near the top closed end of the lower blind bore 58. The check valve ports 82 are configured to substantially equalize pressure between the interior of the lower blind bore 58 above the check valve member 80 and space outside the relief valve housing 48 adjacent the lower blind bore 58 and above the check valve member 80. The illustrated check valve ports 82 are substantially perpendicular to the central longitudinal axis 34 of the lower blind bore 58 and the relief valve housing 48 so that flow into and out of the check valve ports 82 is generally horizontal. The illustrated relief valve housing 48 is provided with four of the check valve ports 82 equally spaced about the outer circumference of the relief valve housing 48 but it is noted that any suitable quantity of one or more of the check valve ports 82 can be utilized.

A filter screen 83 is provided at the lower end of the relief valve housing 48 covering both the relief valve ports 66 and the check valve ports 82 to prevent undesirable particles and/or debris from entering the relief valve ports 82 and/or the check valve ports 82. The illustrated filter screen 83 is cylindrically shaped and sized to closely surround the lower end of the relief valve housing 48 covering both the relief valve ports 66 and the check valve ports 82 but any other suitable configuration can alternatively be utilized such as, for example, separate filter screens. The illustrated filter screen 83 comprises wire mesh but any other suitable material can alternatively be utilized.

The illustrated relief valve piston 52 is configured to be closely received in the lower portion 56*b* of the upper blind bore 56 of the relief valve housing 48 for vertical longitudinal sliding movement therein. The lower end of the relief valve piston 52 carries the relief valve member 54 that is configured to cooperate with the relief valve seat 50 of the relief valve housing 48 to open and close the relief valve 14. The relief valve 14 is closed when the relief valve member 54 is moved into engagement with the relief valve seat 50 so that fluid cannot not pass from the relief valve ports 66 to the return line ports 68. The relief valve 14 is open when the relief valve member 54 is disengaged from the relief valve seat 50 so that fluid can pass from the relief valve ports 66 to the return line ports 68. The illustrated relief valve piston 52 includes a central longitudinally-extending first passage 84 extending along the central longitudinal axis 34 of the relief valve piston 52 and the relief valve 14 from the lower end of the relief valve piston 52 to the return line ports 68 of the relief valve housing 48 and transfer ports 86 connecting the first passage 84 to the outer circumference of the relief valve piston 52 at the return line ports 68 so that the relief valve ports 66 are in fluid flow communication with the return line ports 68 when the relief valve member 54 is disengaged from the relief valve seat 50. The illustrated transfer ports 86 are substantially perpendicular to the central longitudinal axis 34 of the first passage 84 and the relief valve piston 52 so that flow into and out of the illustrated transfer ports 86 is generally horizontal. The illustrated relief valve piston 52 is provided with four of the transfer ports 86 equally spaced about the outer circumference of the relief valve piston 52 but it is noted that any suitable quantity of one or more of the transfer ports 86 can be utilized. The illustrated relief valve piston 52 also includes a central longitudinally-extending second passage 87 extending along the central longitudinal axis 34 of the relief valve piston 52 and the relief valve 14 from the upper end of the relief valve piston 52 to the upper end of the first passage 84 so that the lower end of the pilot cylinder 22 below the pilot piston 24 is in fluid flow communication with the first passage 84. The diameter of the illustrated second passage 87 is substantially smaller than the diameter of the first passage 84 and the diameter of the transfer ports 86.

The illustrated relief valve piston 52 is also provided with a circumferential recess between the transfer ports 86 and the relief valve member 54 which receives a seal 88 and a backup seal 90 in the form of O-rings that cooperate with the inner circumferential outer wall of the lower portion 56*b* of the upper blind bore 56 of the relief valve housing 48 to form a suitable fluid-tight seal therebetween between the relief valve ports 66 and the return line ports 68. It is noted that any other suitable type of fluid-tight seals 88, 90 can alternatively be utilized.

The upper end of the illustrated relief valve piston 52 is provided with a reduced diameter portion 52*a* sized and shaped for insertion into the lower end of the spring 26 and forming an upward facing engagement surface 92 about the reduced diameter portion 52*a* for engaging the lower end of the spring 26. Configured in this manner, the illustrated spring 26 operates directly between the lower end of the pilot piston 24 and the upper end of the relief valve piston 52. The illustrated spring 26 is sized so that, when no pressure is applied to the pilot port 42, the spring 26 extends to engage the top end of the pilot piston 24 against the adjusting member 32 and to engage the relief valve member 54 carried by the relief valve piston 52 against the relief valve seat 50 of the relief valve housing 48.

The illustrated check valve 18 includes the check valve member 80, a check valve retainer 94, and a pair of resilient springs 96, 98. The check valve member 80 is sized and shaped for vertical sliding movement within the lower blind bore 58 of the relief valve housing 48. The lower end of the illustrated check valve member 80 is configured to cooperate with a check valve seat 100 (best seen in FIG. 3) in the control valve housing 72 or element to which the dual-pressure relief valve assembly 10 is to be installed. The illustrated lower end of the check valve member 80 is substantially flat but can alternatively have any other suitable configuration. The check valve 18 is closed when the check valve member 80 is downwardly moved by the springs 96, 98 into engagement with the check valve seat 100 to close the check valve seat 100 so that fluid cannot not pass through the check valve seat 100. The check valve 18 is open when the check valve member 80 is disengaged from the check valve seat 100 against the bias of the springs 96, 98 by fluid pressure so that fluid can pass through the check valve seat 100.

The illustrated check valve member 80 has a central longitudinally-extending blind bore 102 configured for receiving the springs 96, 98 therein for resiliently biasing the check valve member 80 in a downward direction. The illustrated lower blind bore 58 of the relief valve housing 48 has an enlarged bottom portion sized for receiving the check valve retainer 94 therein that forms an upward-facing abutment 104 configured to cooperate with a downward-facing abutment 106 formed by a step in the outer periphery of the check valve member 80. Engagement of the abutment 104 of the check valve retainer 94 forms the downward most limit of movement for the check valve member 80. The illustrated springs 96, 98 are coaxial and both extend between the closed upper end of the lower blind bore 58 of the relief valve housing 48 and the closed lower end of the blind bore 102 of the check valve member 80. Configured in this manner, the springs 96, 98 bias the check valve member 80 to its lower most position in engagement with the abutment 104 of the check valve retainer 94 when the check valve assembly is not installed and into engagement with the check valve seat 100 when the relief valve assembly is installed. The illustrated springs 96, 98 are sized so that the check valve member 80 is raised by fluid pressure against the bias of the springs 96, 98 to disengage from the check valve seat 100 when fluid pressure at the check valve seat 100 is at or above a predetermined pressure and the check valve member 80 is lowered by the bias of the springs to engage the check valve seat 100 when fluid pressure at the check valve seat 100 is below the predetermined pressure. The illustrated springs 96, 98 are helical-coiled compression springs but any other suitable type of spring 96, 98 can alternatively be utilized and or a single spring 96, 98 can alternatively be used.

The illustrated dual-pressure relief valve assembly 10 can be selectively set to actuate the relief valve 14 at one two different predetermined relief pressures. When no fluid pressure is provided to the pilot port 42, the illustrated spring 26 extends to engage the top end of the pilot piston 24 against the adjusting member 32 and to engage the relief valve member 54 carried by the relief valve piston 52 against the relief valve seat 50 of the relief valve housing 48. When fluid pressure at the relief valve ports 66 is below a first or low predetermined relief pressure, such as about 2500 psi, the relief valve member 54 carried by the relief valve piston 52 remains engaged against the relief valve seat 50 of the relief valve housing 48. When fluid pressure at the relief valve ports 66 is at or above the first or low predetermined relief pressure, the relief valve member 54 carried by the relief valve piston 52 is disengaged from the relief valve seat 50 of the relief valve housing 48 so that fluid can enter the relief valve ports 66 and pass through the relief valve 14 to the return line ports 68. When a predetermined pressure is provided to the pilot port 42, the predetermined pressure downwardly moves the pilot piston 24 within the pilot cylinder 22 away from the adjusting member 32 to further compress the spring 26 to engage the relief valve member 54 carried by the relief valve piston 52 against the relief valve seat 50 of the relief valve housing 48 with increased pressure. When fluid pressure at the relief valve ports 66 is below a second or high predetermined relief pressure, such as about 3200 psi, the relief valve member 54 carried by the relief valve piston 52 remains engaged against the relief valve seat 50 of the relief valve housing 48. When fluid pressure at the relief valve ports 66 is at or above the second or high predetermined relief pressure, the relief valve member 54 of the relief valve piston 52 is disengaged from the relief valve seat 50 of the relief valve housing 48 so that fluid can enter the relief valve ports 66 and pass through the relief valve 14 to the return line ports 68.

The high and low predetermined relief pressures can also be adjusted. To adjust the high predetermined relief pressure, the adjusting member 32 is rotated until the pilot piston 24 is totally pushed down into engagement with the relief valve housing 48. With the pilot port 42 vented, fluid pressure is raised at the relief valve ports 66 until the relief valve 14 is actuated (at the current high predetermined relief pressure). To adjust this current high predetermined relief pressure, with the jam nut 60 loosened, the pilot piston housing 20 is turned to move it further into the relief valve housing 48 to increase the high predetermined relief pressure and the pilot piston housing 20 is turned to move it further out of the relief valve housing 48 to decrease the high predetermined relief pressure. Once the desired high predetermined relief pressure is obtained, the jam nut 60 is tightened against the relief valve housing 48 to lock the position of the pilot piston housing 20 relative to the relief valve housing 48. To adjust the low predetermined relief pressure, after the high predetermined relief pressure is adjusted and with the pressure at the relief valve ports 66 still raised, the adjusting member is rotated out in an upward direction until the relief valve operating pressure is at the desired low predetermined relief pressure. To check the operation of the pilot piston 24, a pilot line 108 is attached to the pilot port 42 without raising the pilot pressure. The fluid pressure is then raised at the relief valve ports 66 to the low predetermined relief pressure and the relief valve 14 should open. The predetermined pilot pressure is then applied to the pilot port, and the fluid pressure at the relief valve ports 66 is raised to the high predetermined relief pressure and the relief valve 14 should open.

Referring now FIGS. 3 to 7, a hydraulic pump system 12 according to the present invention includes the illustrated dual-pressure relief valve assembly 10, a control valve assembly 110, and a hydraulic pump assembly 112. The illustrated dual-pressure relief valve assembly 10 is removably installed into the control valve assembly 110, and the illustrated control valve assembly 110 is removably attached to the hydraulic pump assembly 112.

The illustrated control valve assembly 110 includes the control valve housing 72 and a spool valve 114 slidably movable therein in a vertical direction between neutral, raised and lowered positions. The spool valve 114 is provided with spaced-apart upper and lower annular grooves 116, 118 intermediate its upper and lower ends of the spool valve 114. The upper end of the spool valve 114 adjacent to the upper annular groove 116 isolates a hydraulic cylinder chamber 120 from the return line chamber 78 when the spool valve 114 is in the neutral and lowered positions (shown in FIGS. 4 and 6). The upper annular groove 116 interconnects hydraulic cylinder chamber 120 and the return line chamber 78 when the spool valve 114 is in the raised position (shown in FIG. 5). The lower annular groove 118 interconnects a pump chamber 122 and another return line chamber 124 when the spool valve 114 is in the neutral and raised positions (shown in FIGS. 4 and 5). The portion of the spool valve 114 interposed between the upper and lower annular grooves 116, 118 isolates the pump chamber 122 and the return line chamber 124 when the spool valve 114 is in the lowered position (shown in FIG. 6).

Figure 3:
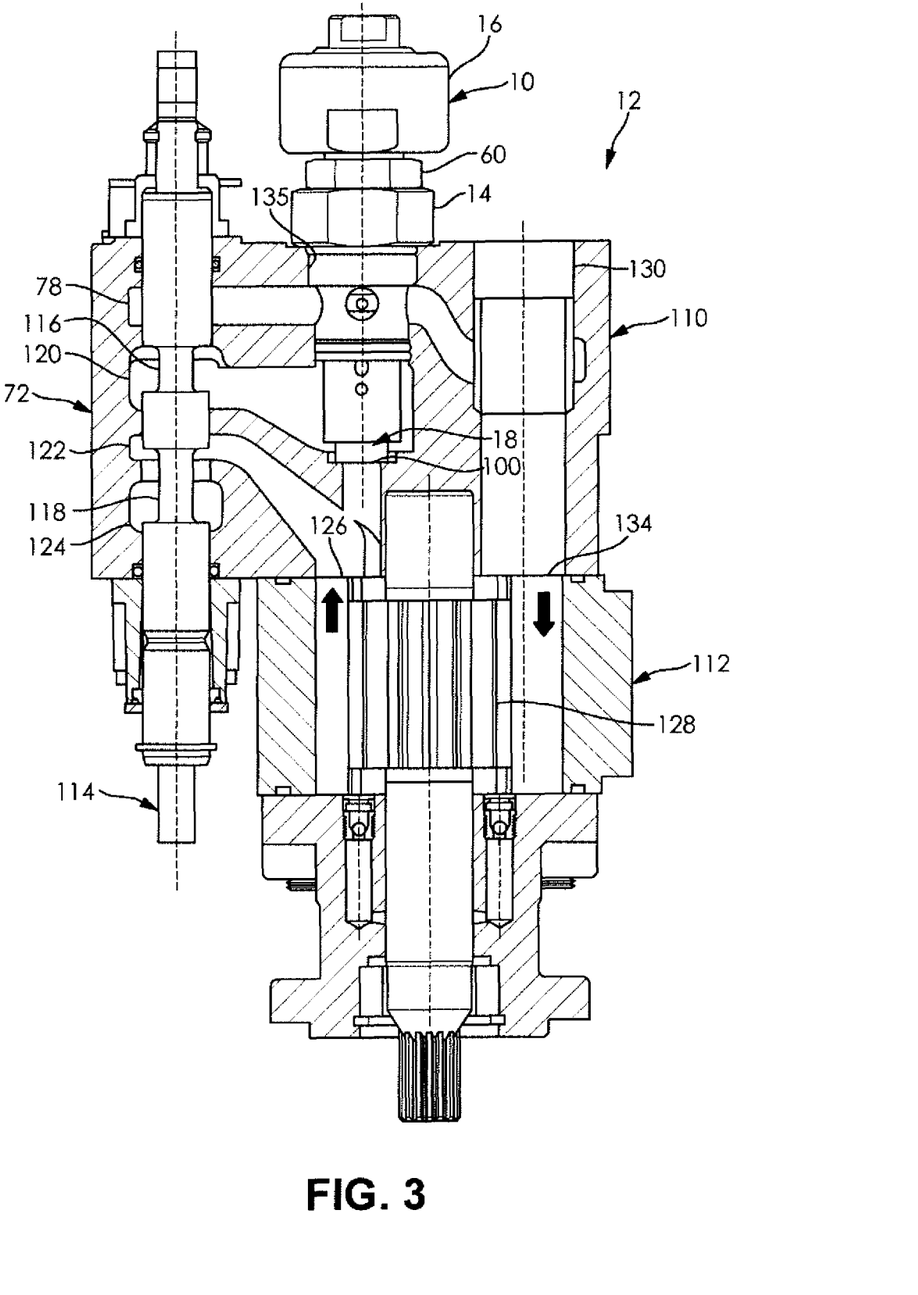
FIG. 3 is an elevational view of a hydraulic pump system according to the present invention with the relief valve assembly of FIGS. 1 and 2 installed therein.
Figure 4:
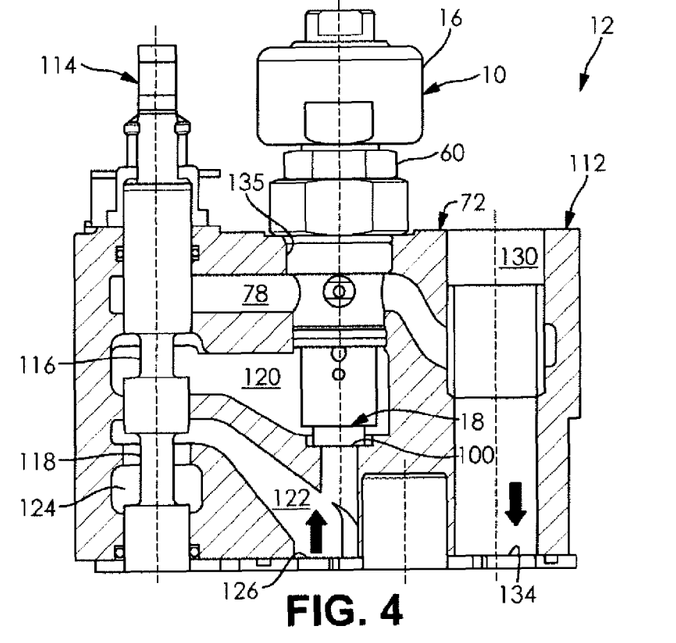
FIG. 4 is an enlarged, fragmented elevation view showing a control valve assembly of the hydraulic pump assembly of FIG. 3, wherein a spool valve is in a neutral position.
Figure 5:
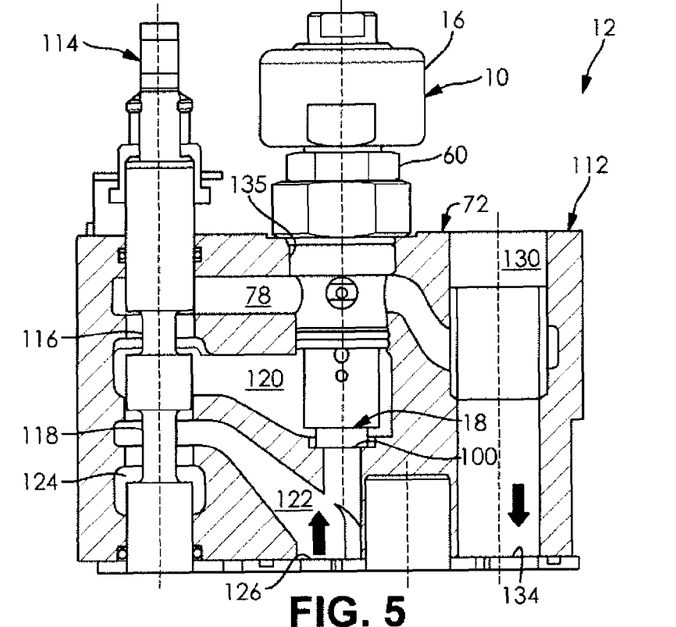
FIG. 5 is an enlarged, fragmented elevation view similar to FIG. 4, but wherein the spool valve is in a raised position.
Figure 6:
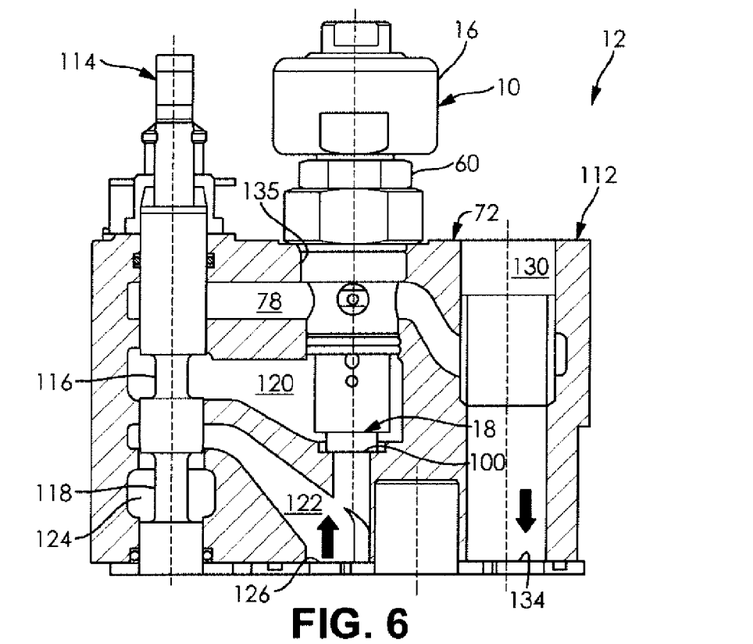
FIG. 6 is an enlarged, fragmented elevation view similar to FIGS. 4 and 5, but wherein the spool valve is in a lowered position.
Figure 7:
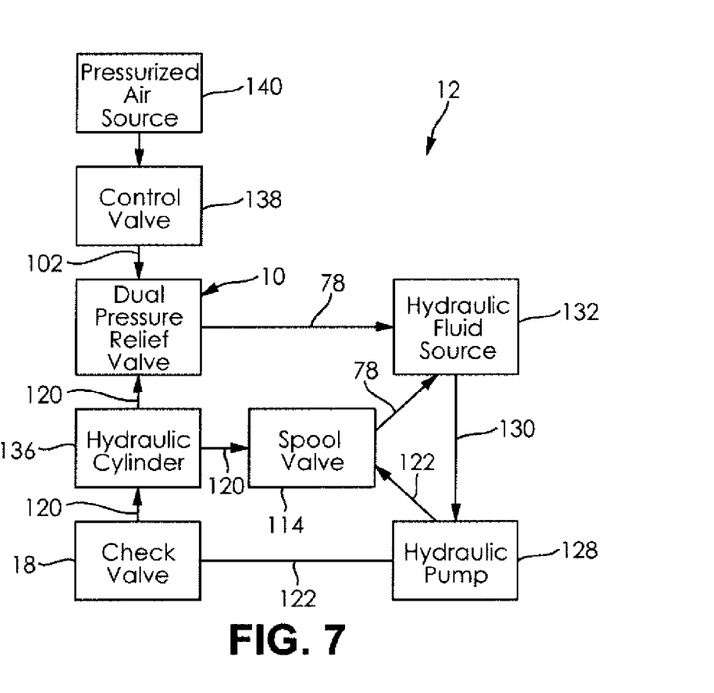
FIG. 7 is a block diagram of the hydraulic pump system of FIGS. 3 to 6.

The pump chamber 122 is in fluid flow communication with an outlet 126 of the hydraulic pump 128. The outlet 126 of the hydraulic pump 128 is also in fluid flow communication with the check valve seat 100 of the check valve 18. The check valve seat 100 of the check valve 18 is in fluid flow communication with the hydraulic cylinder chamber 120. The hydraulic cylinder chamber 120 is connected to a hydraulic cylinder 136 or other hydraulic component to be actuated. An inlet line 130, which is connected to a hydraulic fluid tank 132, is in fluid flow communication with an inlet 134 of the hydraulic pump 128. The return line chambers 78, 124 are in fluid flow communication with the inlet line 130.

With the dual-pressure relief valve assembly 10 fully inserted into a downwardly-extending opening 135 in the top of the control valve housing 72, the check valve member 80 engages the check valve seat 100 under the bias of the springs 96, 98 of the check valve 18 to isolate the outlet 126 of the hydraulic pump 128 from the hydraulic cylinder chamber 120. The relief valve 14 is also closed to isolate hydraulic cylinder chamber 120 from the return line chamber 78. The return line ports 68 of the relief valve 14 are in fluid flow communication with the return line chamber 78 so that the relief valve 14 is in fluid flow communication with the return line chamber 78 which is in turn in fluid flow communication with the inlet line 130 connected to the hydraulic fluid tank 132.

In operation of the hydraulic pump system 12, with the spool valve 114 in the neutral position (shown in FIGS. 3 and 4), fluid flows from the tank 132 to the inlet 134 of the hydraulic pump 128 through the inlet line 130, through the hydraulic pump 128 to the pump outlet 126, from the hydraulic pump outlet 126 to the pump chamber 122, from the pump chamber 122 to the return line chamber 124, from the return line chamber 124 to the inlet line 130. The check valve 18 prevents fluid flow from the pump outlet 126 and the pump chamber 122 to the hydraulic cylinder chamber 120. Therefore, no fluid flow is provided to the hydraulic cylinder 136 to be actuated. With the spool valve 114 in the lowered position (shown in FIG. 6), the pump chamber 122 is isolated from the return line chamber 124 so that fluid pressure in the pump chamber 122 rises to open the check valve 18 and fluid flows from the pump chamber 122 to the hydraulic cylinder chamber 120 to actuate the hydraulic cylinder 136 connected thereto. When the spool valve 114 is in the raised position (shown in FIG. 5), the pump chamber 122 and the hydraulic cylinder chamber 120 are each connected to the return line chambers 124, 78 so that flow from pump outlet 126 returns to the inlet line 130 via the return line chambers 124, 78 (with the check valve 18 closed) and the hydraulic cylinder 136 drains to the inlet line 130 via the hydraulic cylinder chamber 120 and the return line chamber 78. If fluid pressure within the hydraulic cylinder chamber 120 ever exceeds the selected one of the two predetermined actuating pressures of the dual-pressure relief valve assembly 10, the relief valve 14 opens and fluid flows from the hydraulic cylinder chamber 120 to the return line chamber 78 via the relief valve 14 and the return line chamber 78 to reduce the pressure.

If it is desired to change the predetermined actuating pressure of the dual-pressure relief valve assembly 10 from low pressure to high pressure, the predetermined fluid pressure is provided to the pilot port 42 through the pilot line 108 is attached to the pilot port 4. The predetermined fluid pressure can be selectively provided by, for example, actuating an on/off valve 138 connecting the pilot line 108 to a source of compressed air 140. The fluid pressure downwardly moves the pilot piston 24 against the bias of the spring 26 to engage the relief valve member 54 with the relief valve port with increased force to increase the low predetermined relief pressure to the high predetermined relief pressure. It is noted that the on/off valve 138 can be configured for operation remote from the dual-pressure relief valve assembly 10. If it is desired to change the predetermined actuating pressure of the dual-pressure relief valve assembly 10 from high pressure to low pressure, the predetermined fluid pressure is removed from the pilot port 42. The predetermined fluid pressure can be selectively removed by, for example, actuating an on/off valve 138 connecting the pilot line 108 to a source of compressed air 140 to an off position. Removal of the fluid pressure upwardly moves the pilot piston 24 due to the bias of the spring 26 to engage the relief valve member 54 with the relief valve port with decreased force to decrease the high predetermined relief pressure to the low predetermined relief pressure.

Any of the features or attributes of the above the above described embodiments and variations can be used in combination with any of the other features and attributes of the above described embodiments and variations as desired.

It is apparent from the above detailed description of preferred embodiments of the present invention, that the above-disclosed relief valve assembly is, versatile, of relatively non-complex construction, relatively easy to use, and can be remotely actuated to selectively operate at one of at least two predetermined relief pressures by remotely commanding a pilot pressure. It should also be apparent that the above-disclosed relief valve assembly can be easily removed from the hydraulic fluid pump system and replaced to replace both the relief valve and the check valve with the single cartridge containing both the relief valve and the check valve.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A dual-pressure relief valve assembly comprising, in combination:
    a pilot piston housing forming a pilot piston cylinder;
    a pilot piston movable within the pilot piston cylinder of the pilot piston housing;
    a relief valve housing secured to the pilot piston housing and forming a first blind bore, a relief valve seat along the first blind bore near a blind end of the first blind bore, and a second blind bore coaxial with the first blind bore and facing opposite the first blind bore;
    a relief valve piston movable within the first blind bore of the relief valve housing and carrying a relief valve member configured to close the relief valve seat when engaging the relief valve seat;
    a first resilient spring acting between the pilot piston and the relief valve piston;
    wherein the pilot piston cylinder is provided with a pilot port to selectively engage the pilot piston with a predetermined pilot pressure to selectively move the pilot piston toward the first resilient spring and the relief valve piston;
    wherein the first resilient spring biases the relief valve member into engagement with the relief valve seat with a first predetermined relief pressure when the predetermined pilot pressure is not applied to the pilot piston and with a second predetermined relief pressure when the predetermined pilot pressure is applied to the pilot piston wherein the second predetermined relief pressure is larger than the first predetermined relief pressure; and a check valve comprising:
   a check valve member movable within the second blind bore of the relief valve housing; and
   at least one second resilient spring acting between the relief valve housing and the check valve member to bias the check valve member away from the relief valve housing to partially extend out of the relief valve housing.

2. The dual-pressure relief valve assembly according to claim 1, wherein the relief valve housing has at least one relief valve port adjacent the relief valve seat opposite the first blind bore and wherein the at least one relief valve port is in fluid flow communication with the first blind bore when the relief valve member is disengaged with the relief valve seat but not when the relief valve member is engaged with the relief valve seat.

3. The dual-pressure relief valve assembly according to claim 2, wherein the relief valve housing has at least one return line port spaced from the at least one relief valve port opposite the relief valve seat and in fluid flow communication with the first blind bore, and wherein the relief valve piston is provided with a passage that permits flow between the at least one relief valve port and the at least one return line port when the relief valve member is disengaged from the relief valve seat.

4. The dual-pressure relief valve assembly according to claim 3, wherein the relief valve piston is provided with a seal to provide a fluid-tight connection between the relief valve piston and the relief valve housing within the first blind bore between the at least one relief valve port and the at least one return line port.

5. The dual-pressure relief valve assembly according to claim 1, wherein the first resilient spring is a helical coil compression spring.

6. The dual-pressure relief valve assembly according to claim 1, wherein the relief valve housing is adjustably secured to the pilot piston housing with a threaded connection and a jam nut.

7. The dual-pressure relief valve assembly according to claim 1, further comprising an adjuster member adjustably secured to the pilot piston and forming a stop for the pilot piston in a direction opposite the relief valve seat.

8. The dual-pressure relief valve assembly according to claim 1, wherein the check valve further comprises a check valve retainer secured within the second blind bore and forming an outer limit for movement of the check valve member within the second blind bore.

9. The dual-pressure relief valve assembly according to claim 1, wherein the relief valve housing is provided with at least one check valve port in fluid communication with the second blind bore behind the check valve member.

10. A dual-pressure relief valve assembly comprising, in combination:
   an actuating assembly comprising:
      a pilot piston housing forming a pilot piston cylinder;
      a pilot piston movable within the pilot piston cylinder of the pilot piston housing; a relief valve comprising:
      a relief valve housing secured to the pilot piston housing and forming a first bore, a relief valve seat along the first bore, and a second bore;
      a relief valve piston movable within the first bore of the relief valve housing and carrying a relief valve member configured to close the relief valve seat when engaging the relief valve seat; and
      a first resilient spring acting between the pilot piston and the relief valve piston to bias the relief valve member toward the relief valve seat;

wherein the first bore is a first blind bore and the relief valve seat is provided near a blind end of the first blind bore, and wherein the second bore is a second blind bore coaxial with the first blind bore and facing opposite the first blind bore;

wherein the pilot piston cylinder is provided with a pilot port to selectively engage the pilot piston with a predetermined pilot pressure to selectively move the pilot piston toward the first resilient spring and the relief valve piston;

wherein the first resilient spring biases the relief valve member into engagement with the relief valve seat with a first predetermined relief pressure when the predetermined pilot pressure is not applied to the pilot piston and with a second predetermined relief pressure when the predetermined pilot pressure is applied to the pilot piston;

wherein the second predetermined relief pressure is larger than the first predetermined relief pressure; and a check valve comprising:
   a check valve member movable within the second blind bore; and
   at least one second resilient spring acting between the relief valve housing and the check valve member to bias the check valve member away from the relief valve housing.

11. The dual-pressure relief valve assembly according to claim 10, wherein the relief valve housing has at least one relief valve port adjacent the relief valve seat opposite the first blind bore and wherein the at least one relief valve port is in fluid flow communication with the first blind bore when the relief valve member is disengaged with the relief valve seat but not when the relief valve member is engaged with the relief valve seat.

12. The dual-pressure relief valve assembly according to claim 11, wherein the relief valve housing has at least one return line port spaced from the at least one relief valve port opposite the relief valve seat and in fluid flow communication with the first blind bore, and wherein the relief valve piston is provided with a passage that permits flow between the at least one relief valve port and the at least one return line port when the relief valve member is disengaged from the relief valve seat.

13. The dual-pressure relief valve assembly according to claim 12, wherein the relief valve piston is provided with a seal to provide a fluid-tight connection between the relief valve piston and the relief valve housing within the first blind bore between the at least one relief valve port and the at least one return line port.

14. The dual-pressure relief valve assembly according to claim 10, wherein the first and second resilient springs are each a helical coil compression spring.

15. The dual-pressure relief valve assembly according to claim 10, wherein the relief valve housing is adjustably secured to the pilot piston housing with a threaded connection and a jam nut.

16. The dual-pressure relief valve assembly according to claim 10, further comprising an adjuster member adjustably secured to the pilot piston and forming a stop for the pilot piston in a direction opposite the relief valve seat.

17. The dual-pressure relief valve assembly according to claim 10, wherein the check valve further comprises a check valve retainer secured within the second blind bore and forming an outer limit for movement of the check valve member within the second blind bore.

18. The dual-pressure relief valve assembly according to claim 10, wherein the relief valve housing is provided with at least one check valve port in fluid communication with the second blind bore behind the check valve member.

19. A dual-pressure relief valve assembly comprising, in combination:

an actuating assembly comprising:
- a pilot piston housing forming a pilot piston cylinder;
- a pilot piston movable within the pilot piston cylinder of the pilot piston housing;
- a relief valve comprising:
- a relief valve housing secured to the pilot piston housing and forming a first blind bore, a relief valve seat along the first bore near a blind end of the first blind bore, and a second blind bore;
- wherein the second blind bore is coaxial with the first blind bore and facing opposite the first blind bore;
- a relief valve piston movable within the first bore of the relief valve housing and carrying a relief valve member configured to close the relief valve seat when engaging the relief valve seat; and
- a first resilient spring acting between the pilot piston and the relief valve piston to bias the relief valve member toward the relief valve seat;
- wherein the pilot piston cylinder is provided with a pilot port to selectively engage the pilot piston with a predetermined pilot pressure to selectively move the pilot piston toward the first resilient spring and the relief valve piston;
- wherein the first resilient spring biases the relief valve member into engagement with the relief valve seat with a first predetermined relief pressure when the predetermined pilot pressure is not applied to the pilot piston and with a second predetermined relief pressure when the predetermined pilot pressure is applied to the pilot piston;
- wherein the second predetermined relief pressure is larger than the first predetermined relief pressure; and a check valve comprising:
- a check valve member movable within the second blind bore;
- at least one second resilient spring acting between a blind end of the second blind bore and the check valve member to bias the check valve member away from the blind end of the second blind bore; and
- a check valve retainer secured within the second blind bore and forming an outer limit for movement of the check valve member within the second blind bore.

* * * * *